(12) United States Patent
Kim

(10) Patent No.: US 8,431,206 B2
(45) Date of Patent: Apr. 30, 2013

(54) MULTIPURPOSE ADHESIVE TAPE

(75) Inventor: Sun-Ki Kim, Kyeonggi-do (KR)

(73) Assignees: Joinset Co., Ltd. (KR); Sun-Ki Kim (KR)

( * ) Notice: Subject to any disclaimer, the term of this patent is extended or adjusted under 35 U.S.C. 154(b) by 280 days.

(21) Appl. No.: 12/839,153

(22) Filed: Jul. 19, 2010

(65) Prior Publication Data

US 2011/0206886 A1    Aug. 25, 2011

(30) Foreign Application Priority Data

Feb. 19, 2010   (KR) .................. 10-2010-0014975

(51) Int. Cl.
*B32B 9/00* (2006.01)
*B32B 3/00* (2006.01)
*B32B 7/12* (2006.01)
*B32B 15/04* (2006.01)
*H01B 7/08* (2006.01)

(52) U.S. Cl.
USPC ......... 428/40.1; 428/40.9; 428/343; 428/344; 428/544; 428/906; 174/117 A

(58) Field of Classification Search ............... 428/40.1, 428/41.1, 343, 344, 906, 40.9, 544; 174/117 A
See application file for complete search history.

(56) References Cited

U.S. PATENT DOCUMENTS

| | | | | |
|---|---|---|---|---|
| 3,497,383 A | * | 2/1970 | Stow et al. | 428/162 |
| 3,778,306 A | * | 12/1973 | Stow et al. | 428/335 |
| 4,988,550 A | * | 1/1991 | Keyser et al. | 428/41.1 |
| 5,354,614 A | * | 10/1994 | Cox et al. | 428/343 |

FOREIGN PATENT DOCUMENTS

| | | |
|---|---|---|
| JP | 2008-143949 A | 6/2008 |
| KR | 84-5512 U | 10/1984 |

* cited by examiner

*Primary Examiner* — Patricia Nordmeyer
(74) *Attorney, Agent, or Firm* — Locke Lord LLP; Alan B. Clement; Peter J. Fallon

(57) ABSTRACT

A multipurpose adhesive tape with minimized curling is provided. The adhesive tape includes a base formed as a thin sheet, an adhesive attached to the reverse surface of the base, and a projection projecting along the length of the outer surface of the base within a portion of the width thereof.

19 Claims, 2 Drawing Sheets

MULTIPURPOSE ADHESIVE TAPE

FIELD OF THE INVENTION

The present invention relates to a multipurpose adhesive tape, and more particularly, to a multipurpose adhesive tape with minimized curling. The present invention also relates to multipurpose adhesive tape that is made in different thicknesses, provides sufficient thickness with a small size to cut manufacturing costs, and has diverse electrical and mechanical applications.

DESCRIPTION OF THE RELATED ART

As electronic devices and data communication devices use higher operating frequencies and become more miniaturized with higher integration, they are increasingly affected by heat, static electricity, and EMI (ElectroMagnetic Interference). For example, as high frequency electronic components such as microprocessors and memories are given faster processing speeds, greater storage capacities, and smaller dimensions, they generate greater amounts of heat and EMI. Such high frequency electronic components, modules, and cables are also greatly affected by static electricity and EMI from the surrounding environment.

Thus, in order to prevent EMI generated by such high frequency electronic components, modules, and cables from being transmitted externally, and in order to also protect such high frequency components, modules, and cables from externally-generated EMI, such high frequency components, modules, and cables are electrically and mechanically connected through an electrically conductive adhesive tape to a PCB (Printed Circuit Board) ground pattern or an electrically conductive case, to shield the high frequency components, modules, and cables from EMI and ground them.

Here, the electrically conductive adhesive tape must have good electrical conductivity to improve EMI shielding effectiveness. In particular, it must have sufficient EMI shielding effectiveness at high frequencies of 30 MHz and above, according to standards set by the US FCC (Federal Communications Commission) and other bodies.

Therefore, the related art has employed products, such as electrically conductive adhesive tape made by 3M USA, which consist of a metal foil of copper or aluminum with a thickness of about 0.02 mm to about 0.12 mm or an electrically conductive fiber that has an electrically conductive adhesive formed on one side thereof.

Such electrically conductive adhesive tape must have good flexibility and must be thin in order to be used in narrow spaces, when applied to a flexible printed circuit board or flexible circuit cable used in small mobile devices.

Under these circumstances, there have been difficulties with related art electrically conductive adhesive tape in terms of thickness uniformity and suitability for use in various applications for opposed structures or cables. For example, when electrically conductive adhesive tape having good flexibility and uniform thinness is used, it cannot reliably adhere opposed structures when disposed between them because of its thinness.

Conventional adhesive tapes that include such electrically conductive adhesive tape are manufactured using a coater to continuously apply adhesive on the reverse surface of a base such as a polymer film of a predetermined thickness that is continuously unwound and fed from a roller of a relatively large diameter, after which the adhesive is thermally hardened, and the film is continuously wound onto another roller of a relatively large diameter. Then, the long adhesive tape wound on the roller of the relatively large diameter is wound onto a paper roll of a comparatively smaller diameter according to lengths specified by clients and sold to the clients. Because the adhesive tape is wound onto paper rolls having smaller diameters, when the adhesive tape is unwound for use, the adhesive tape exhibits a tendency to curl back to its original wound state, rendering the adhesive tape difficult to use. This curling tendency is more pronounced with smaller diameter paper rolls and thinner bases. In particular, metal foil adhesive tape that employs metal foil as a base has a strong tendency to curl due to the restoring force of metal foil.

For the same reason, when an electrically conductive adhesive tape formed of thin metal foil supplied from a related art roll is cut in a certain width and has its release sheet removed for use, because of the curling tendency of the electrically conductive adhesive tape to return to its original state on the roll, the electrically conductive adhesive tape curls severely and becomes inconvenient to use. Also, adhesive tape that employs thin metal foil without the use of a release sheet experiences severe curling.

Moreover, because metal foil adhesive tape employing a thin metal foil undergoes severe curling, it is difficult to wrap cables, etc. subsequently with metal foil adhesive tape.

Such curling tendency is not limited to electrically conductive adhesive tape, however, and can also be manifested in polymer film adhesive tapes employing unwound polymer film.

Further, because such electrically conductive adhesive tape has uniform thickness, it is therefore limited in its ability to dissipate heat and be used in a variety of applications.

According to other related art—namely, Seiren Co., Ltd.'s conductive urethane foam—an electrically conductive adhesive tape is formed by defining holes in urethane sponge of about 0.5 mm or more in thickness, plating metal thereon, and applying an electrically conductive adhesive on the reverse surface thereof. With this technology, however, such a thick electrically conductive adhesive tape is difficult to use for flexible PCBs or flexible circuit cables of mobile devices requiring overall thinness and flexibility, due to its thickness and also its high price.

In other related art, there is polymer film adhesive tape that includes a polymer film such as the widely-used PET (PolyEthylene Terephthalate) that is coated on its reverse side with an acrylic adhesive. However, such a related art polymer film adhesive tape is difficult to use for diverse applications because of its uniform thickness.

SUMMARY OF THE INVENTION

An object of the present invention is to provide a multipurpose adhesive tape, which substantially overcomes one or more of the problems due to the limitations and disadvantages of the related art.

Another object of the present invention is to provide a multipurpose adhesive tape having differing thicknesses within the same integral piece.

A further object of the present invention is to provide a multipurpose adhesive tape that is inexpensive and has diverse shapes.

A still further object of the present invention is to provide a multipurpose adhesive tape in which curling is minimized even when it is thin.

An even further object of the present invention is to provide a multipurpose adhesive tape with facilitated electrical and mechanical coupling with opposed structures.

A yet further object of the present invention is to provide a multipurpose adhesive tape that has resilience with respect to opposed structures and can provide electrical connection.

An additional object of the present invention is to provide a multipurpose adhesive tape that dissipates a greater amount of heat.

Another additional object of the present invention is to provide a multipurpose adhesive tape that has both resilience and flexibility.

A further additional object of the present invention is to provide a multipurpose adhesive tape that has a shock absorbing function.

A still further additional object of the present invention is to provide a multipurpose adhesive tape that has an anti-slip function.

According to an aspect of the present invention, there is provided a multipurpose adhesive tape including: a base formed as a thin sheet; an adhesive attached to the reverse surface of the base; and a projection projecting along the length of the outer surface of the base within a portion of the width thereof.

According to another aspect of the present invention, there is provided a multipurpose adhesive tape including: a base formed as a thin sheet; an adhesive attached to a reverse surface of the base; a release sheet adhered to a reverse surface of the adhesive; and a projection projecting along a length of an outer surface of the base within a portion of a width thereof, wherein the projection minimizes curling of the base when the release sheet is removed.

According to a further aspect of the present invention, there is provided a multipurpose adhesive tape including: a base formed as a thin sheet provided in a roll; an adhesive attached to a reverse surface of the base; and a projection projecting along a length of an outer surface of the base within a portion of a width thereof, wherein the projection minimizes curling of the base.

According to a still further aspect of the present invention, there is provided a multipurpose electrically conductive adhesive tape including: an electrically conductive base formed as a thin sheet; an electrically conductive adhesive attached to a reverse surface of the base; a release sheet attached to a reverse surface of the electrically conductive adhesive; and an electrically conductive resilient member projecting along a length of an outer surface of the base within a portion of a width thereof, wherein the resilient member projects to a thickness greater than the base, and minimizes curling of the base.

According to an even further aspect of the present invention, there is provided a multipurpose electrically conductive adhesive tape including: an electrically conductive base formed as a thin sheet provided in a roll; an electrically conductive adhesive attached to a reverse surface of the base; and an electrically conductive resilient member projecting along a length of an outer surface of the base within a portion of a width thereof, wherein the resilient member projects to a thickness greater than the base, and minimizes curling of the base.

The height of the projection may be greater than a thickness of the base.

The base may be one selected from an electrically conductive fiber, a metal foil, and an electrically conductive film formed of a polymer film with a metal foil on a top and bottom of the polymer film.

The base may have a thickness of about 0.02 mm to about 0.15 mm, the adhesive may have a thickness of about 0.01 mm to about 0.1 mm, and a height of the projection may be about 0.1 mm to about 1.5 mm.

The adhesive may be formed of one selected from urethane, acrylic, epoxy, silicon rubber, and a composition thereof mixed with metal powder.

The adhesive may be formed on only a portion of the reverse surface of the base.

The projection may be semispherical and arranged consecutively to form at least one column in the length direction of the base, or the projection may be a line continuing in the length direction of the base or may be a zigzagging line.

The projection may be formed of one of a thermoplastic resilient polymer resin and a silicon rubber, and may selectively have electrical conductivity.

The projection may be formed by printing or casting a liquid polymer resin or a silicon rubber on the outer surface of the base, and hardening the printed or cast resin or rubber.

The portion within the outer surface of the base on which the projection projects may be 30% or less of the total outer surface area of the base.

A portion where the projection is not formed may be used as an electrically conductive tape, and a portion where the projection is formed may be used as an electrically conductive gasket.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Now, preferred embodiments of the present invention will be described in detail with reference to the accompanying drawings.

Figure 1:
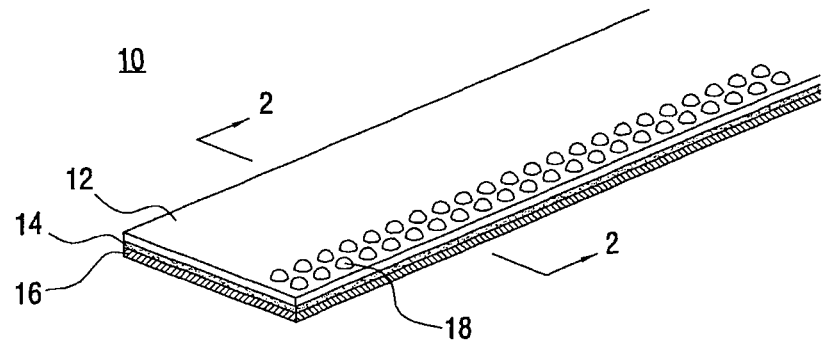
FIG. 1 is a perspective view of a multipurpose adhesive tape according to an embodiment.
Figure 2:
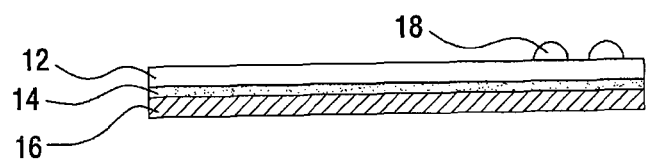
FIG. 2 is a sectional view taken along line 2-2 in FIG. 1.

FIG. 1 is a perspective view of a multipurpose adhesive tape according to an embodiment.

Referring to FIG. 1, a multipurpose adhesive tape 10 includes a base 12 formed as a thin sheet, an adhesive 14 attached to the reverse surface of the base 12, and a plurality of projections 18 projecting in columns along the length of the surface of the base 12 within a portion of the width thereof. A release sheet 16 such as release paper or release film may be adhered to the reverse surface of the adhesive 14, but is not required in forming the adhesive tape 10.

According to this configuration, the projections 18 minimize curling during use, which is the tendency for a length of the base 12 that is cut from a roll to revert to its original shape.

That is, curling of the multipurpose adhesive tape 10 may be minimized by the size, weight, and formed locations of the projections. Curling may also be minimized due to the coexistence of portions at which the projections are and are not formed, and stress generated when the projections 18 are formed on the base 12.

In particular, curling is pronounced when the base 12 is formed of a metal foil that is thin, which may be minimized by the projections 18.

Here, the size, formed location, and number of the projections 18 on the base 12 are factors that minimize curling.

Because the portion of the width of the base 12 on which the projections 18 are formed increases the thickness of the adhesive tape 10 by the height of the projections 18, two regions of mutually different thicknesses can be formed on a single base 12. Thus, by cutting lengthwise along the boundary between the regions where the projections 18 are and are not formed, tape can efficiently be used for sets of opposed objects that require different tape thicknesses.

Specifically, because the portion on which the projections 18 are formed increases the actual thickness of the adhesive tape 10, a sufficient thickness may be obtained, even if the portion formed by the base 12 and adhesive 14 is thin. Thus, because the actual thickness of the adhesive tape 10 may be increased while retaining flexibility without having to increase the thickness of the base 12, the tape can be efficiently used in small electronic devices.

Also, the portion on which the projections 18 are not formed is thin and has good flexibility, and the portion on which the projections 18 are formed may provide resilient adhesion between opposed objects.

Further, by configuring the projections 18 as resilient members, they may function as shock absorbers for adhered objects, and may also have an anti-slip function. However, the projections 18 are not limited thereto, and may be formed of a polymer resin such as PET.

With the portion on which the projections 18 are formed, because space can be made between the projections 18 to allow easy flow of air, heat generated by an adhered object may quickly be dissipated. Particularly, when the projections 18 are electrically conductive, heat from the base 12 may be effectively dissipated through the projections 18.

The height of the projections 18 may be made greater than the thickness of the base 12, in consideration of factors such as cost effectiveness, prevention of curling, and efficiency.

The multipurpose adhesive tape 10 may have electrical conductivity to block EMI and provide electrical grounding, and may have vertical electrical conductivity or may have horizontal electrical conductivity.

The projection 18 may be an electrically conductive resilient member to provide EMI blocking and resilient electrical grounding. The electrically conductive resilient member may be electrically conductive silicon rubber that is formed by applying and thermally hardening liquid electrically conductive silicon rubber.

However, embodiments are not limited thereto, and any one of the base 12, adhesive 14, and projection 18 may have electrical conductivity.

When the base 12 has electrical conductivity, the base 12 may be one of an electrically conductive fiber, metal foil, and an electrically conductive film formed of a polymer film between metal foil formed at the top and bottom thereof. Also, when the base 12 is insulating, it may be a polymer resin film such as PET.

The thickness of the base 12 may be about 0.02 mm to about 0.15 mm

The adhesive 14 may be formed of one selected from urethane, acrylic, epoxy, silicon rubber, and a composition thereof mixed with metal powder.

The adhesive 14 may be formed on a portion of the reverse surface of the base 12, and the thickness of the adhesive 14 may be about 0.01 mm to about 0.1 mm.

The adhesive 14 may be formed on a surface of the base 12 using conventional adhesive tape manufacturing equipment and processes.

The projection 18 may be formed in various shapes or patterns. Referring to FIG. 1, the projection 18 is semispherical and formed in two rows along the length of the base 12.

While the shape of the projection 18 is not limited to being semispherical, because it may be formed on the outer surface of the base 12 by printing and hardening liquid polymer or silicon rubber, its shape is likely to be semispherical.

The projection 18 may be formed through a printing or casting process using liquid polymer resin or silicon rubber.

The projections 18 may further be formed evenly across the entire surface of the base 12 at a uniform distance from one another.

In consideration of manufacturing cost, product efficiency, etc., the projection 18 may have a height that is greater than the thickness of the base 12, and more particularly, the projection 18 may have a height of about 0.1 mm to about 1.5 mm.

Figure 3:
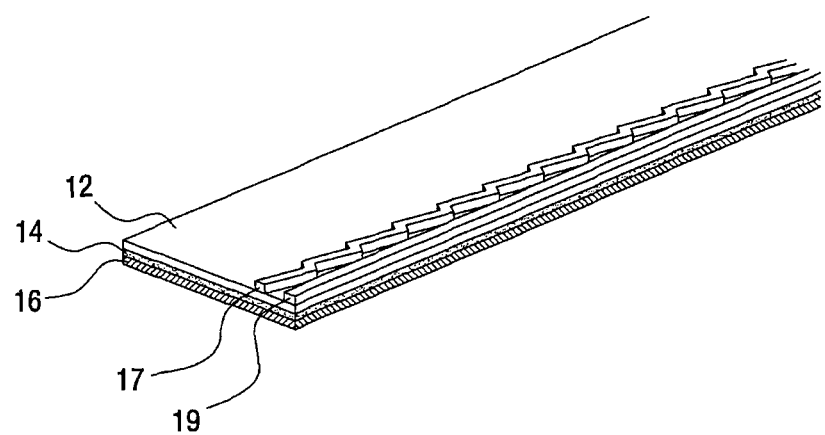
FIG. 3 is a perspective view of a multipurpose adhesive tape according to another embodiment.

Alternatively, as shown in FIG. 3, a continuous line-shaped projection 19 or a zigzagging line-shaped projection 17 may be formed instead of the projections 18.

The height of the projection 18 may be about 0.1 mm to about 1.5 mm, and the material of the projection 18 may be one of a thermoplastic resilient polymer resin and silicon rubber, or an electrically conductive silicon rubber.

When considering only the factors of cost competiveness and minimizing curling, the surface area on which the projection 18 is formed may be 30% or less of the total surface area of the base 12.

Figure 4:
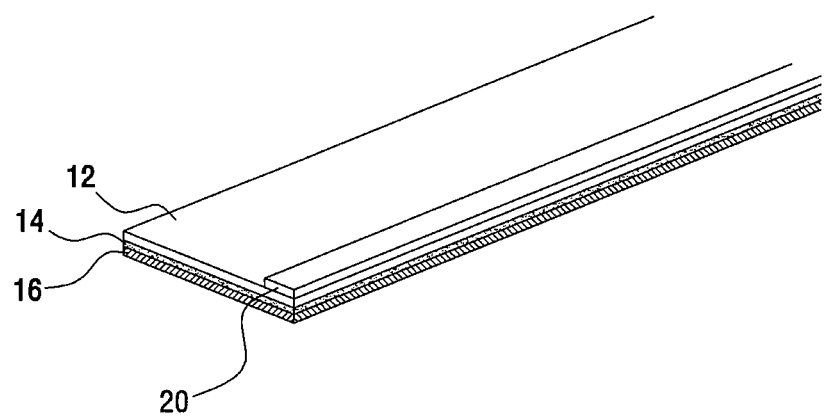
FIG. 4 is a perspective view of a multipurpose adhesive tape according to a further embodiment.

FIG. 4 is a perspective view of a multipurpose adhesive tape according to a further embodiment.

According to this embodiment, a portion of the width on the outer surface of a base 12 may be entirely covered by an electrically conductive resilient member 20 such as an electrically conductive rubber. Here, the electrically conductive resilient member 20 corresponds to the projections 18 in FIG. 1.

With this configuration, by cutting lengthwise along the boundary between the portions where the electrically conductive resilient member 20 is and is not formed, the portion where the electrically conductive resilient member 20 is formed may be used as a flexible electrically conductive tape, and the portion where the electrically conductive resilient member 20 is not formed may be used as a thick electrically conductive gasket.

That is, the region on which the electrically conductive resilient member 20 is formed to be used as an electrically conductive gasket may be disposed between opposed objects to provide resilience and electrical connection between the opposed objects.

In this case, the area on which the electrically conductive resilient member 20 is formed may be 30% or less of the total surface area of the base 12, when considering cost effectiveness and efficiency.

While in the above embodiments, the base 12, adhesive 14, and projection 18 have been described as being electrically conductive, embodiments are not limited thereto, and a portion or the entirety of the base 12, adhesive 14, and projection 18 may be an insulating member, depending on the intended application of the adhesive tape.

According to the above configurations, adhesive tape having differing thicknesses within the same integral piece may be provided.

Adhesive tape that is inexpensive and has diverse shapes may also be provided.

In addition, curling may be minimized even with thin tape.

Further, electrical and mechanical coupling with opposed structures may be facilitated by electrically conductive resilient members.

The amount of heat dissipated may also be increased.

Additionally, resilience and flexibility may both be obtained.

Anti-slip and shock absorption effects may further be obtained.

While the present invention has been described in detail, it should be understood that various changes, substitutions and alterations can be made hereto without departing from the spirit and scope of the invention as defined by the appended claims.

What is claimed is:

1. A multipurpose adhesive tape comprising:
a base formed as a thin sheet;
an adhesive attached to a reverse surface of the base; and
an electrically conductive resilient projection projecting along a length direction of an outer surface of the base within a portion along a width direction from one end hereof,
wherein, the projection is formed by hardening a liquid polymer resin or a silicon rubber coated on the outer surface of the base.

2. The multipurpose adhesive tape of claim 1, wherein the base and the adhesive have electrical conductivity.

3. The multipurpose adhesive tape of claim 1, wherein a height of the projection is greater than a thickness of the base.

4. The multipurpose adhesive tape of claim 1, wherein the base is one selected from an electrically conductive fiber, a metal foil, and an electrically conductive film formed of a polymer film with a metal foil on a top and bottom of the polymer film.

5. The multipurpose adhesive tape of claim 1, wherein the adhesive is formed of one selected from urethane, acrylic, epoxy, silicon rubber, and a composition thereof mixed with metal powder.

6. The multipurpose adhesive tape of claim 1, wherein the adhesive is formed on only a portion of the reverse surface of the base.

7. The multipurpose adhesive tape of claim 1, wherein the projection is semispherical and is arranged consecutively to form at least one column in the length direction of the base.

8. The multipurpose adhesive tape of claim 1, wherein the projection is a line continuing in the length direction of the base or is a zigzagging line.

9. The multipurpose adhesive tape of claim 1, wherein the projection is formed of one of a thermoplastic resilient polymer resin and a silicon rubber.

10. The multipurpose adhesive tape of claim 1, wherein the portion within the outer surface of the base on which the projection projects is 30% or less of the total outer surface area of the base.

11. The multipurpose adhesive tape of claim 1, wherein the base and the adhesive have electrical conductivity, a portion where the projection is not formed is used as an electrically conductive tape, and a portion where the projection is formed is used as an electrically conductive gasket.

12. A multipurpose adhesive tape comprising:
a base formed as a thin sheet provided in a roll;
an adhesive attached to a reverse surface of the base; and
an electrically conductive resilient projection projecting along a length of an outer surface of the base within a portion from a width direction from one end thereof,
wherein, the projection is formed by hardening a liquid polymer resin or a silicon rubber coated on the outer surface of the base, and the projection minimizes curling of the base.

13. A multipurpose adhesive tape comprising:
a base formed as a thin sheet;
an adhesive attached to a reverse surface of the base;
a release sheet adhered to a reverse surface of the adhesive; and
an electrically conductive resilient projection projecting along a length of an outer surface of the base within a portion from a width direction from one end thereof,
wherein, the projection is formed by hardening a liquid polymer resin or a silicon rubber coated on the outer surface of the base, and the projection minimizes curling of the base when the release sheet is removed.

14. A multipurpose electrically conductive adhesive tape comprising:
an electrically conductive base formed as a thin sheet provided in a roll;
an electrically conductive adhesive attached to a reverse surface of the base; and
an electrically conductive resilient member projecting along a length of an outer surface of the base within a portion along a width from one end thereof,
wherein, the projection is formed by hardening a liquid polymer resin or a silicon rubber coated on the outer surface of the base,
and the resilient member projects to a thickness greater than the base, and minimizes curling of the base.

15. The multipurpose electrically conductive adhesive tape of claim 14, wherein the electrically conductive base is one selected from an electrically conductive fiber or metal foil, and a polymer film formed with metal.

16. The multipurpose electrically conductive adhesive tape of claim 14, wherein electric current passes vertically through the multipurpose electrically conductive adhesive tape.

17. A multipurpose electrically conductive adhesive tape comprising:
an electrically conductive base formed as a thin sheet;
an electrically conductive adhesive attached to a reverse surface of the base;
a release sheet attached to a reverse surface of the electrically conductive adhesive; and
an electrically conductive resilient member projecting along a length of an outer surface of the base within a portion along a width direction from one end thereof,
wherein, the projection is formed by hardening a liquid polymer resin or a silicon rubber coated on the outer surface of the base, and the resilient member projects to a thickness greater than the base, and minimizes curling of the base.

18. The multipurpose electrically conductive adhesive tape of claim 17, wherein the electrically conductive base is one selected from an electrically conductive fiber or metal foil, and a polymer film formed with metal.

19. The multipurpose electrically conductive adhesive tape of claim 17, wherein electric current passes vertically through the multipurpose electrically conductive adhesive tape.

* * * * *